United States Patent [19]

Hata et al.

[11] Patent Number: 4,818,921
[45] Date of Patent: Apr. 4, 1989

[54] APPARATUS FOR CONTROLLING A MOTOR IN A CAMERA

[75] Inventors: Daisuke Hata, Funabashi; Susumu Iguchi; Yoshimi Ohno, both of Kawasaki; Kazumasa Aoki, Tokyo; Takayuki Hatase, Yokohama, all of Japan

[73] Assignee: Ricoh Company, Ltd., Tokyo, Japan

[21] Appl. No.: 90,348

[22] Filed: Aug. 28, 1987

[30] Foreign Application Priority Data

Sep. 1, 1986 [JP] Japan .................................. 61-205333

[51] Int. Cl.⁴ ............................................... H02P 3/08
[52] U.S. Cl. ................................. 318/269; 354/173.1; 354/173.11
[58] Field of Search ............... 318/258, 259, 261, 262, 318/269, 270, 273, 274, 275, 362; 354/170, 171, 173.1, 173.11

[56] References Cited

U.S. PATENT DOCUMENTS

| | | | |
|---|---|---|---|
| 4,196,993 | 4/1980 | Stemme et al. | 354/173.11 |
| 4,343,545 | 8/1982 | Onogi | 354/173.1 |
| 4,405,221 | 9/1983 | Yoshida et al. | 354/173.11 |
| 4,571,044 | 2/1986 | Wakabayashi | 354/173.11 |
| 4,679,925 | 7/1987 | Kawamura et al. | 354/173.1 |
| 4,679,926 | 7/1987 | Suzuki et al. | 354/173.11 |
| 4,697,899 | 10/1987 | Kawamura et al. | 354/173.11 |
| 4,734,732 | 3/1988 | Nishio et al. | 354/173.11 |
| 4,752,793 | 6/1988 | Kawamura et al. | 354/173.11 |

FOREIGN PATENT DOCUMENTS

| | | | |
|---|---|---|---|
| 2904461 | 1/1980 | Fed. Rep. of Germany | 354/173.11 |
| 58-1134 | 1/1983 | Japan | 354/173.1 |

Primary Examiner—Bentsu Ro
Attorney, Agent, or Firm—Oblon, Fisher, Spivak, McClelland & Maier

[57] ABSTRACT

An apparatus for controlling a motor in a camera including, a motor drive unit for driving the motor in a prescribed sequence, a braking device for applying the brakes on the motor in accordance with the prescribed sequence, and a speed detecting unit for monitoring the speed of the motor and permitting initiation of the next action only after the speed of the motor, in consequence of application of the brakes by the braking device, is brought to a level incapable of obstructing the next action.

4 Claims, 5 Drawing Sheets

APPARATUS FOR CONTROLLING A MOTOR IN A CAMERA

BACKGROUND OF THE INVENTION

This invention relates to an apparatus for the control of a motor in a camera such as, for example, the autofocus camer which is provided with a motor drive mechanism.

2. Discussion of the Background

The conventional autofocus cameras and other cameras of the type provided with a motor drive mechanism are adapted so that they are not allowed to initiate a next action until their motors are brought to a full stop by application of the brakes thereon.

Since these conventional cameras are not allowed to start any next motion until their motors, on completing one motion, are brought to a full stop, therefore, they have a disadvantage that they process a series of actions only at a low speed.

SUMMARY OF THE INVENTION

The first object of this invention is to provide a camera so configured that it starts monitoring the speed of a motor after the brakes are applied on the motor, and when the motor speed reaches a level incapable of obstructing the next action before the motor is brought to a full stop, initiates the next action, which camera is therefore characterized by processing a series of actions at a high speed.

The second object of this invention is to provide a camera so configured that it controls the motor speed to a prescribed level before application of the brakes on the motor, which camera is therefore characterized by eliminating dispersion of interval between the time the brakes are applied on the motor and the time the motor is brought to a full stop.

The third object of this invention is to provide a camera so constructed that the next action is initiated after an elapse of a prescribed length of time after the brakes are applied on the motor, which camera is therefore characterized by application on the motor of the brakes optimum severally for the sequential actions to be performed.

The first object of this invention mentioned above is accomplished by an apparatus for controlling a motor in a camera which comprises a motor drive unit adapted to drive the motor in a prescribed sequence, a braking device for applying the brakes on the motor in accordance with the prescribed sequence, and a speed detecting unit adapted to monitor the speed of the motor and permit initiation of the next action only after the speed of the motor, in consequence of application of the brakes by the braking device, is brought to a level incapable of obstructing the next action.

The second object of this invention mentioned above is accomplished by an apparatus for controlling a motor in a camera which comprises, a motor driving unit adapted to drive the motor in a prescribed sequence, a speed detecting unit adapted to monitor the speed of the motor, a speed controlling unit adapted to control the motor driving unit in order that the speed of the motor maintains a prescribed level in accordance with a detection signal transmitted from the speed detecting unit, and a braking device adapted to apply the brakes on the motor in accordance with the prescribed sequence, said apparatus being adapted to initiate the next action simultaneously with an application of the brakes by the braking device.

The third object of this invention mentioned above is accomplished by an apparatus for controlling a motor in a camera which comprises, a motor driving unit adapted to drive the motor in a prescribed sequence, a braking device adapted to apply the brakes on the motor in accordance with the prescribed sequence, a speed detecting unit adapted to monitor the speed of the motor and transmit a signal when the speed of the motor, in consequence of application of the brakes by the braking device, is lowered below a prescribed level, and a timer for initiating a next action after an elapse of a prescribed length of time after reception of the signal from the speed detecting unit.

In one aspect of the present invention, the camera of the present invention is enabled to process a series of actions speedily because next action is initiated when the speed of the motor, in consequence of the application of the brakes, is brought to a level incapable of obstructing the next action. In another aspect of the present invention, the camera is enabled to obtain optimum times for applying brakes with respect to the individual actions of the series and preclude dispersion of the stop positions of objects driven by the motor, since in initiating each next action after application of the brakes on the motor, the speed of the motor prior to the application of the brakes is controlled to a prescribed level and the next action is initiated immediately after application of the brakes on the motor, or the next action is initiated after an elapse of a prescribed length of time after the speed of the motor is lowered below a prescribed level.

This invention need not be restricted to the embodiments to be cited herein below but may be practiced otherwise without departing from the spirit of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
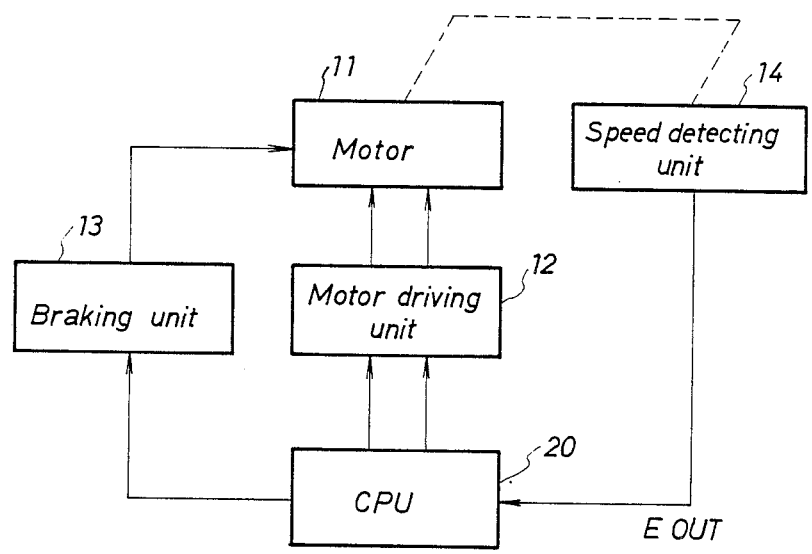
FIG. 1 is a block diagram of a first embodiment of this invention.

Various other objects, features and attendant advantages of the present invention will become better understood from the following detailed description when considered in connection with the accompanying drawings in which like reference characters designate like or corresponding parts throughout the several views.

The first embodiment of this invention will now be described using FIGS. 1 and 2. In FIG. 1, a motor 11 serves the purpose of driving a focusing lens or other similar member in an autofocus camera, for example. This motor 11 is driven by a motor driving unit 12 in accordance with a prescribed sequence. The motor driving unit 12 is controlled by a sequence controlling CPU (central processing unit) 20 in accordance with a prescribed sequence. The rotational speed of the motor 11 is detected by a speed detecting unit 14. The speed detecting unit 14 is formed of an optical or magnetic rotary encoder mechanically connected to the motor 11, for example, and is adapted to transmit a detection signal E OUT in the form of pulses in accordance with the rotational speed of the motor 11 and feed this detection signal to the CPU 20. The CPU 20 controls a braking unit 13 in accordance with the prescribed sequence and causes it to apply brakes on the motor 11. The CPU 20 is adapted to receive the detection signal E OUT transmitted from the speed detecting unit 14 in order to cause the braking unit 13 to apply brakes on the motor, and initiate the next action after the speed of the motor 11 has reached a level incapable of obstructing the next action.

Figure 2:
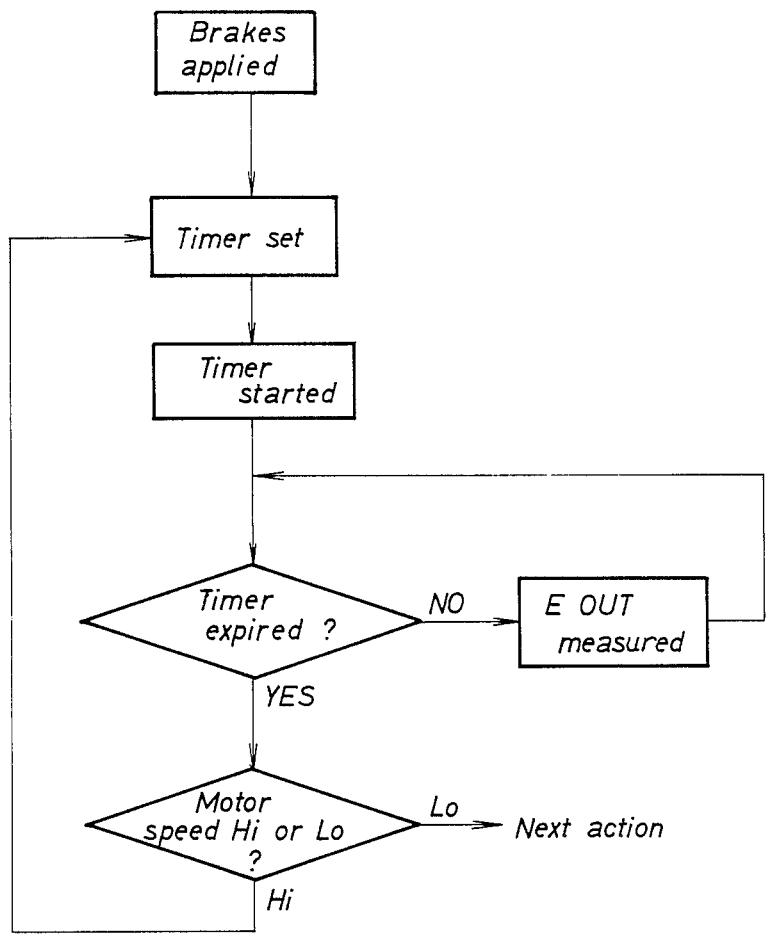
FIG. 2 is a flow chart illustrating the sequence of actions to be performed in the first embodiment.

FIG. 2 is a flow chart illustrating the actions to be performed in the first embodiment described above.

When one action is completed, the CPU 20 causes the braking unit 13 to apply the brakes on the motor 11 and, at the same time, sets the timer clocking. The CPU 20 measures the pulse interval of the detection signal E OUT transmitted from the speed detecting unit 14, i.e. the time required for the detection signal E OUT to shift from the "H" level to the "L" level or the time required to shift from the "L" level to the "H" level, to determine whether the pulse interval is longer or shorter than the time set on the timer and, when the pulse interval is longer than the set time, concludes that the speed of the motor has reached a level incapable of obstructing the next action and, on this conclusion, allows the next action to be initiated. When the pulse interval is shorter than the set time, the CPU resets the timer and restarts it for repeating the measurement of the pulse interval of the detection signal E OUT instead of permitting initiation of the next action.

The set time on the timer, therefore, is set in conformity with the speed of the motor enough for the next action to be carried out without any obstruction.

The embodiment described above brings about an improvement in the speed of processing of a series of actions, because after one action is completed and the brakes are applied on the motor 11, the next action is initiated when the speed of the motor 11 reaches a level enough for the next action to be carried out without any obstruction even if the motor 11 is not brought to a full stop.

Figure 3:
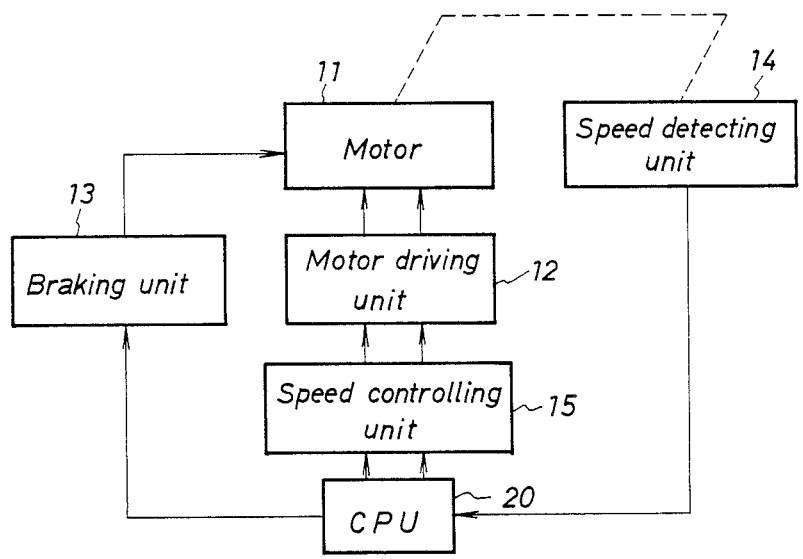
FIG. 3 is a block diagram of a second embodiment of this invention.
Figure 4:
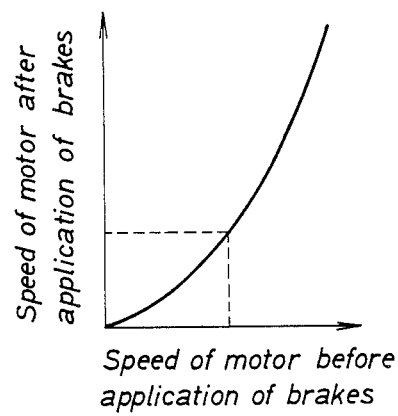
FIG. 4 isa diagram showing the relation between the speed of a motor before application of the brakes thereon and the speed of the motor after the application of the brakes.
Figure 5:
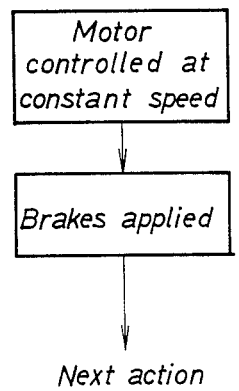
FIG. 5 is a flow chart illustrating the sequence of actions to be performed in the second embodiment.

The second embodiment of the present invention is shown in FIGS. 3 through 5.

The block diagram of FIG. 3 is different from the block diagram of FIG. 1 in respect that it has a speed controlling unit 15 additionally interposed between the CPU 20 and the motor driving unit 12.

This speed controlling unit 15 controls the motor driving unit 12 in accordance with the detection signal transmitted from the speed detecting unit 14 in order to adjust the speed of the motor 11 at a prescribed level. The CPU 20 is adapted to cause the braking unit 13 to apply brakes on the motor 11 and, after this application of the brakes, conclude that the speed of the motor 11 offers no obstruction to the next action, and, based on this conclusion, permit initiation of the next action.

FIG. 5 is a flow chart illustrating the actions to be performed in the second embodiment. Here, the motor 11 is assumed to be controlled at a certain speed. When one action is completed, the brakes are applied on the motor 11 and the next action is immediately initiated. As illustrated in FIG. 4, when the brakes are applied on the motor, a certain relation exists between the speed of the motor prior to the application of the brakes and the speed of the motor after the application of the brakes. To be specific, this relation is such that the speed of the motor after the application of the brakes increases in proportion to the speed of the motor before the application of the brakes. When the motor is controlled at a constant speed before the application of the brakes, the speed of the motor after the application of the brakes is substantially constant.

When the speed of the motor before the application of the brakes is controlled in such a manner that the speed of the motor after the application of the brakes will be at a level incapable of obstructing the initiation of the next action, the initiation of the next action can be effected immediately after the brakes are applied on the motor as in the preceding embodiment. By this setup, therefore, the processing of the series of actions can be expedited and the dispersion of the time required for the motor to come to a full stop can be eliminated.

Figure 6:
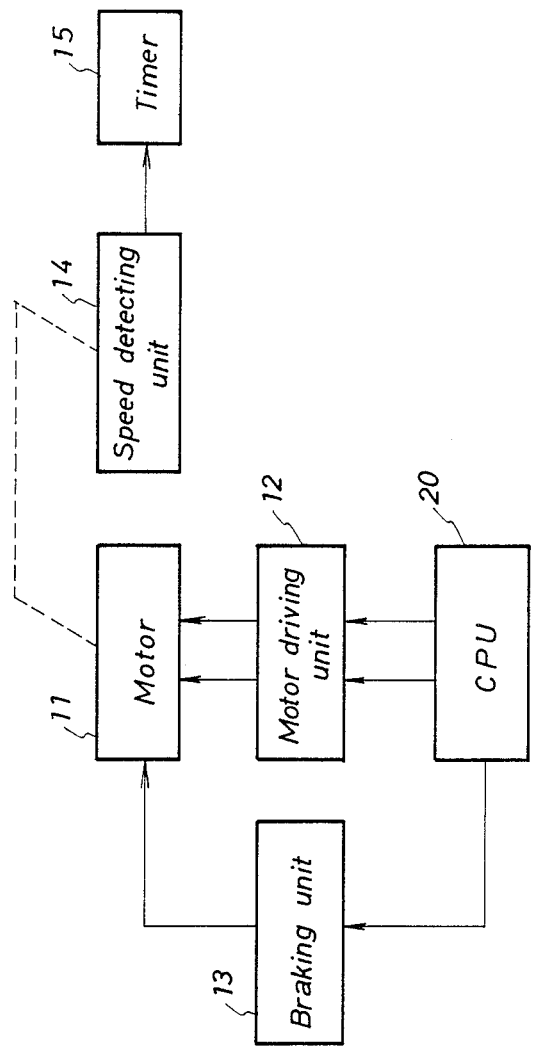
FIG. 6 is a block diagram of a third embodiment of the present invention.

The third embodiment of the present invention will now be described referring to FIG. 6 and FIG. 7. The speed detecting unit 14 serving to monitor the speed of the motor is adapted to transmit a signal when the speed of the motor, in consequence of the application of the brakes by the braking unit 13, is lowered below a prescribed level. This embodiment additionally has a timer 15 for initiating the next action after an elapse of a prescribed length of time after reception of the output signal from the speed detecting unit 14. The timer incorporated in the CPU may be utilized for this purpose.

Figure 7:
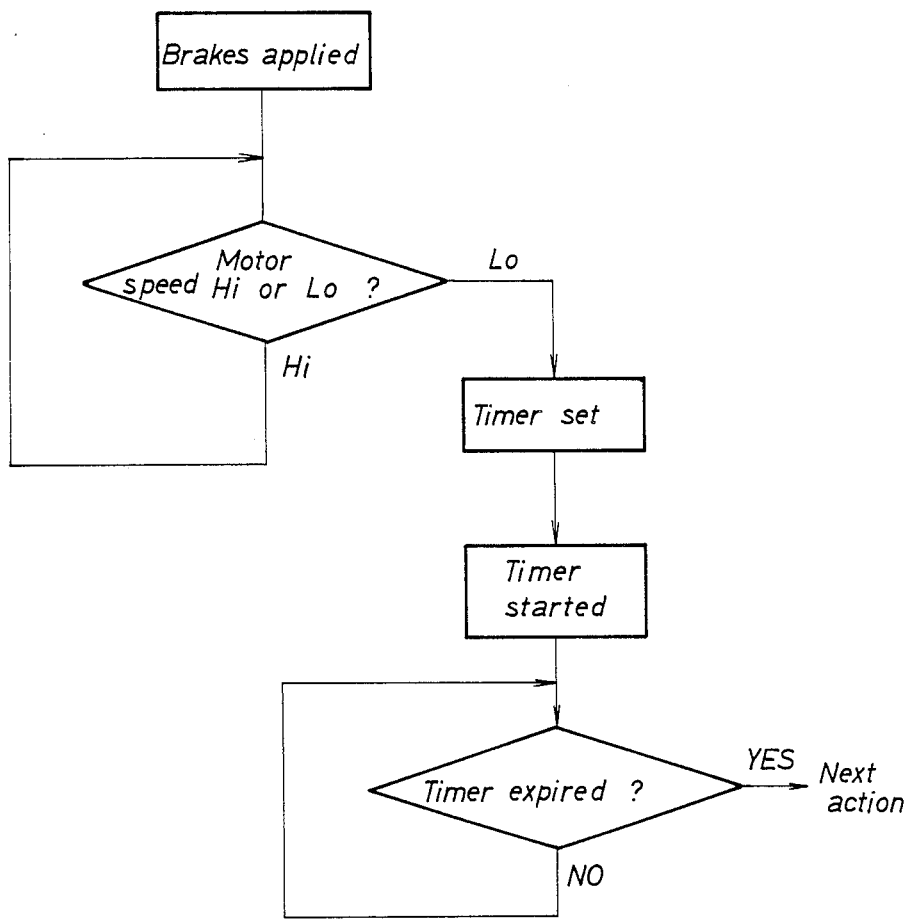
FIG. 7 is a flow chart illustrating the sequence of actions to be performed in the third embodiment.

FIG. 7 is a flow chart illustrating the actions to be performed in the present embodiment.

In FIG. 7, when the speed of the motor is lowered below a prescribed level after one action is completed and the brakes are applied on the motor, the speed detecting unit 14 transmits a signal and this signal sets a prescribed time on the timer and sets the timer clocking. The next action is initiated when the time so set on the timer elapses.

In accordance with the embodiment described above, a prescribed waiting time is interposed between the time a given action is finished and the time the next action is initiated. The waiting time ensures provision of the optimum braking time.

The braking unit to be used in the present invention may be an electrical braking device or a mechanical braking device.

The object to be driven by the motor is not specifically restricted. Examples of the object include a focusing lens in an autofocus camera, a film-winding mechanism in a motor-driven camera, and a motor-driven shutter.

What is claimed is:

1. An apparatus for controlling a motor in a camera comprising, a motor drive unit for driving said motor in a prescribed sequence, a braking device for applying the brakes on said motor in accordance with said prescribed sequence, and a speed detecting unit for monitoring the speed of said motor and permitting initiation of the next action only after the speed of said motor in consequence of application of the brakes by said braking device, is brought to a level incapable of obstructing the next action.

2. An apparatus for controlling a motor in a camera comprising, a motor driving unit for driving said motor in a prescribed sequence, a speed detecting unit for monitoring the speed of said motor and producing a speed detection signal, a speed controlling unit for controlling said motor driving unit thereby maintaining the speed of said motor at a prescribed level in accordance with said detection signal, and braking device for applying the brakes on said motor in accordance with said prescribed sequence, said motor being driven at a relatively low speed when the brakes are applied so that said apparatus may initiate a next picture taking action simultaneously with the application of the brakes by said braking device.

3. An apparatus for controlling a motor in a camera comprising, a motor driving unit for driving said motor in a prescribed sequence, a braking device for applying the brakes on said motor in accordance with said sequence, a speed detecting unit for monitoring the speed of said motor and transmitting a signal when the speed of said motor, in consequence of application of the brakes by said braking device, is lowered below a prescribed level, and a timer for initiating a next action after an elapse of a prescribed length of time after reception of said signal from said speed detecting unit.

4. An apparatus for controlling a motor in a camera comprising, a motor driving unit for driving said motor in a prescribed sequence, a braking device for applying the brakes on said motor in accordance with said sequence, a speed detecting unit for monitoring the speed of said motor, and a speed controlling unit for controlling said motor driving unit in accordance with a detection signal transmitted from said speed detecting unit thereby maintaining the speed of said motor before an application of the brakes by said braking device at such a level that the speed of said motor after the application of the brakes falls immediately to a level incapable to obstructing a next action, said apparatus being adapted to initiate the next action simultaneously with the application of the brakes by said braking device.

* * * * *